United States Patent [19]

Rabren

[11] Patent Number: 5,035,774
[45] Date of Patent: Jul. 30, 1991

[54] RECOVERY OF SOLVENT FROM ACETYLENE STEEL CYLINDERS TO MAKE THE CYLINDERS DISPOSABLE

[75] Inventor: Michael S. Rabren, Citronelle, Ala.

[73] Assignee: North American Cylinders, Citronelle, Ala.

[21] Appl. No.: 514,008

[22] Filed: Apr. 26, 1990

[51] Int. Cl.⁵ ............................. B01D 3/00; B08B 7/04
[52] U.S. Cl. ................................. 202/164; 202/185.3; 202/205; 134/10
[58] Field of Search ........... 202/170, 164, 205, 185.03; 203/91; 134/10, 19

[56] References Cited

U.S. PATENT DOCUMENTS

| | | |
|---|---|---|
| 529,338 | 11/1894 | Murphy . |
| 686,772 | 10/1901 | Seltzer ................................. 202/164 |
| 951,110 | 3/1910 | Gilchrist ............................. 202/164 |
| 3,483,092 | 2/1969 | Young ..................................... 203/2 |
| 4,323,429 | 4/1982 | Hoover ................................. 202/83 |
| 4,457,805 | 7/1984 | Pastor ................................... 202/83 |
| 4,488,933 | 10/1984 | Glaunch et al. .................... 202/83 |
| 4,536,256 | 8/1985 | Pastor ................................. 202/164 |
| 4,690,180 | 9/1987 | Gold ..................................... 141/51 |
| 4,770,748 | 9/1988 | Cellini et al. ..................... 202/185 |
| 4,800,930 | 1/1989 | Rabren ................................. 141/9 |
| 4,879,004 | 11/1989 | Oesch et al. ...................... 202/170 |

Primary Examiner—Theodore Morris
Assistant Examiner—Saeed T. Chaudhry
Attorney, Agent, or Firm—Nixon & Vanderhye

[57] ABSTRACT

Process for recovering acetone from used acetylene cylinders in order to make the cylinders disposable as a solid waste. A system is described for effecting the acetone recovery.

13 Claims, 2 Drawing Sheets

RECOVERY OF SOLVENT FROM ACETYLENE STEEL CYLINDERS TO MAKE THE CYLINDERS DISPOSABLE

The present invention relates to the field of hazardous waste disposal and, in particular, to the recovery of organic solvent, typically acetone, from used acetylene cylinders to make the cylinders disposable as solid waste rather than a hazardous waste.

BACKGROUND OF THE INVENTION

Acetylene is widely used in oxy-acetylene torches by means of which temperatures of up to 3500° C. can be reached for welding and cutting of metals. Acetylene, however, is inherently unstable and, at pressures greater than about 2 atmospheres, may explode violently.

Under current industrial practice, acetylene is safely stored and shipped in steel cylinders under a pressure of about 15 atmospheres. The acetylene-containing cylinders are produced by filling the cylinder with a porous material and injecting into the cylinder a solvent, usually acetone, in which acetylene is soluble. The porous material comprises a capillary system of interconnecting micropores, typically having a size range of about 10 to 20 microns, and is typically calcium silicate having a porosity in excess of 90%. Acetylene is then introduced into the cylinder and is distributed throughout the capillary system of the porous material as a result of dissolution in the acetone. In this way, it is possible to ensure safe storage of dissolved acetylene in quantities of up to eight times the volume of the gas which could be stored without the porous mass/solvent system.

During the lifetime of acetylene cylinders, they are subjected to numerous gas filling, gas discharging and transportation operations. During any of those operations, the cylinder can be subjected to corrosive chemicals, dents, gouges, fire, arc burns and other damaging events such as breakdown of the internal porous mass. As a result of such damaging occurrences, the cylinders are often rendered unfit for subsequent use and must therefore be disposed of in a safe manner.

Exhausted acetylene cylinders containing residual acetone which could otherwise leach into the environment upon disposal of the cylinder are classified as a hazardous waste under the environmental protection laws. Moreover, on-site storage of a hazardous waste also constitutes a violation of the environmental protection laws. In addition, acetone is expensive and gives rise to increased costs if not recovered from exhausted acetylene cylinders.

Thus, a need exists to develop an effective way of removing residual acetone from exhausted acetylene cylinders to thereby convert the cylinders from a hazardous waste to an acceptable solid waste, and also to enable recovery of acetone for further use.

SUMMARY OF THE INVENTION

According to one aspect of the present invention, there is provided a solvent recovery system suitable for recovering solvent from used acetylene cylinders and converting the acetylene cylinders from a hazardous waste to an acceptable solid waste. The system comprises one or more acetylene cylinders each containing a porous material having organic solvent absorbed therein, heating means for heating the cylinders over an extended period of time at a temperature above the boiling point of the solvent, collecting means for collecting solvent recovered from the cylinders, and a manifold means connected to the cylinders and the collecting means for transporting solvent in the vapor phase from the cylinders to the collecting means.

According to another aspect of the invention, there is provided a method of collecting solvent from used acetylene cylinders, comprising the steps of heating the cylinders to a temperature above the boiling point of the solvent for a sufficient period of time to vaporize the solvent from the porous material within the cylinders, and collecting the vaporized solvent.

As a result of the invention, the used acetylene cylinders are rendered fit for disposal as a solid waste rather than a hazardous waste. Moreover, a significant economic benefit is realised by the invention in that the recovered solvent is available to be recycled for further use.

BRIEF DESCRIPTION OF THE DRAWINGS

The invention will now be further described with reference to the accompanying drawings, in which.

DETAILED DESCRIPTION OF THE INVENTION

Figure 1:
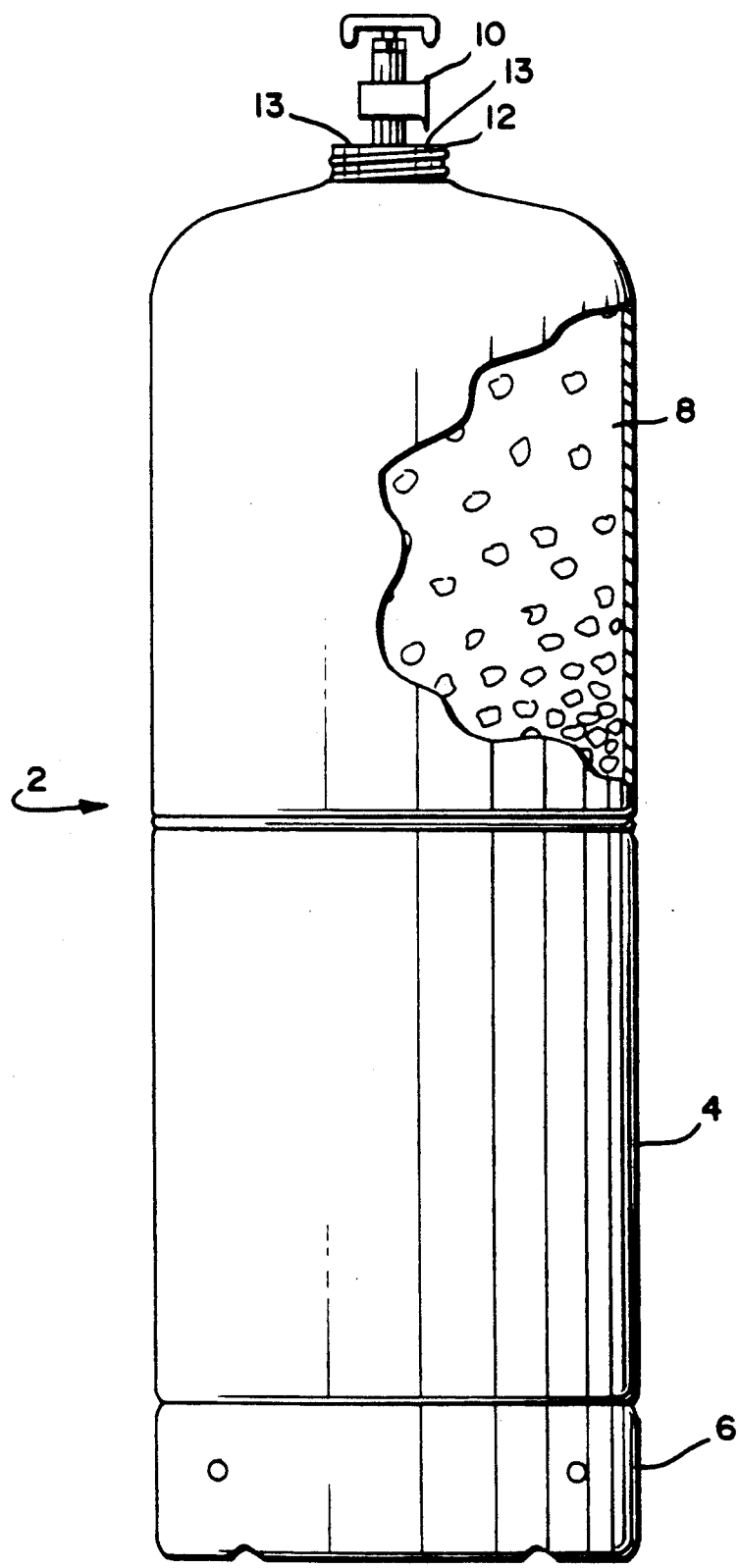
FIG. 1 is a sectional view of a typical acetylene cylinder from which solvent is removed according to the present invention.

Referring to the drawings, FIG. 1 shows a typical acetylene cylinder, generally referenced 2, having a steel shell 4 mounted on a stand 6. A porous filler 8 is provided within the cylinder in accordance with conventional techniques and occupies substantially the entire of the internal volume of the cylinder. The cylinder is provided with boss 12 welded in the cylinder, and valve 10 is connected to the boss 12. In addition, the boss contains fusible plugs 13, usually two, which function to relieve pressure in the cylinder in the event that the temperature increases beyond a predetermined upper limit.

Figure 2:
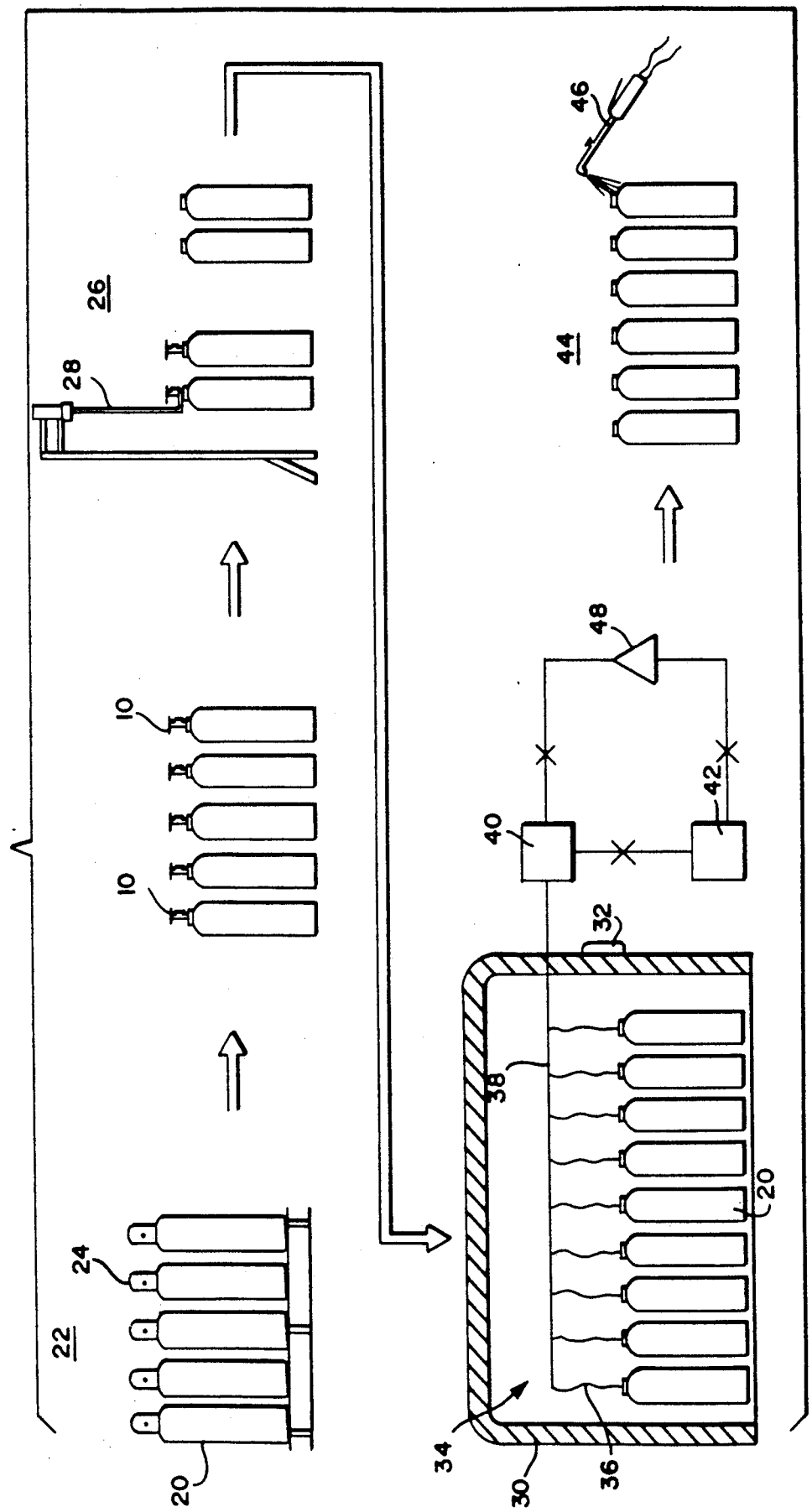
FIG. 2 is a schematic flow diagram illustrating the system and process of the invention.

FIG. 2 illustrated schematically the process and system of the invention. As a preliminary step, the cylinders 20 are assembled at an inspection site 22. The valve covers 24 of the cylinders are removed to expose the valves 10, and the boss 12 inspected to ensure that the fusible plugs therein are intact. The valves are then removed at a valve removal station 26 using a conventional valve removing apparatus 28. The cylinders with the valves removed are then forwarded to a heating arrangement 30 provided with a timing means 32 for controlling the length of time and the temperature for which the cylinders are heated in the heating arrangement 30. The cylinders are connected to a manifold system 34 comprising a series of branch lines or pigtails 36 each connected to a main line 38 contained within the heating arrangement 30. Connection to the manifold system 34 can be effected using any suitable method, such as screwing, welding or by the use of conventional quick connect components. The manifold system is connected to a solvent collecting container 40, typically a condensor unit, which in turn is connected to a solvent storage tank 42. Once the solvent recovery has been completed, the cylinders are forwarded to a shell cutting station 44 to prepare them for final disposal according to conventional techniques, typically using an oxyacetylene torch 46.

The number of acetylene cylinders 20 which can be subject to solvent recovery according to the invention in any one operation is, in principle, unlimited. In practice, the number of cylinders is determined by the size of the heating arrangement 30.

The heating arrangement 30 imparts direct heat to the cylinders 20 to effect evaporation of the solvent in the porous material 8 into the manifold system 34 and subsequently into the collecting container 40. According to one embodiment, the heating arrangement 30 can be an oven capable of directly heating the cylinders with hot air to a temperature of 180° F. or more. In a typical situation, where the process is carried out under atmospheric pressure conditions, it is necessary to heat the cylinders to a temperature about 60° to 80° F. higher than the boiling point of the solvent. For example, where the solvent is acetone (boiling point about 133° F. (56° C.)), it is generally necessary to heat the cylinders to a temperature in the region of 180 to 210° F.

In order to facilitate recovery of acetone from the cylinders, it is necessary to effect the heating process for an extended period of time. Control of the time over which the cylinders are heated in the heating arrangement is effected by way of the timing means 32. The timing means is typically set so that the heating arrangement heats the cylinders to the required temperature for a period of at least 6 hours, for example at least 8 hours, such as about 10 to 80 hours, and more usually about 24 hours. As discussed in more detail below, the heating period may be shorter, for example of the order of about 6 to 8 hours, if the process is carried out under reduced pressure conditions. Other heating periods can be preset as desired.

As an alternative to employing an oven operated at atmospheric pressure, it is possible to carry out the process under reduced pressure using an oven or an autoclave. When an autoclave is used, it can be used as a direct steam heating chamber for the cylinders, or can be used under vacuum to reduce the boiling temperature of the solvent and thereby increase the efficiency of the solvent removal. An at least partial vacuum is applied by means of a vacuum pump 48. The pump may be located between the collecting container 40 and the storage tank 42, or at any other point which would facilitate the generation of a reduced pressure. When the system is operated under reduced pressure, it is important to ensure that a closed system exists between the cylinders and the solvent storage system so as to improve the efficiency of the vacuum arrangement. It has been found that adequate solvent removal from the acetylene cylinders is not achieved under reduced pressure conditions unless the heating is carried out for at least 6 hours.

The invention of the present application can be employed with any size of acetylene cylinder. The most popular size is that referred to as a "140", i.e. a cylinder having a capacity of about 140 cubic feet. Such a cylinder generally contains about 16 to 18 lbs of acetone. The smallest cylinder is referred to as a "10", i.e. one having a capacity of about 10 cubic feet, and generally contains about 1.25 to 1.5 lbs of acetone. The largest cylinder is a "450", i.e. one having a capacity of about 450 cubic feet, and containing in the region of 50 lbs of acetone.

The manifold system 34 is made from materials which are resistant to acetone and other substances which are likely to come in contact with the system. Typical materials which may be used for the manifold and associated piping system are copper, steel, brass, galvanized piping, teflon line piping and the like.

The collecting container 40 is typically a condensor unit adjusted to condense the acetone vapor. Preferably the condenser is an air-cooled aluminum coil heat exchanger. However, the invention is not limited to the use of such a condensing system, and any appropriate condensor may be employed. For example, the condensor unit can employ cooling coils with or without refrigeration, or may employ an evaporation cooling system. Good recovery of the solvent is observed when the condensor is cooled to within the range of about 25° to 34 F., for example about 33 F.

Recovered acetone is transferred from the condensor unit 40 to a storage tank 42. Any suitable storage arrangement may be employed for this purpose.

EXAMPLES

The invention will now be illustrated by following non-limiting examples.

EXAMPLE 1

A group of 100 used acetylene cylinder manufactured from about 1939 to 1968 was subjected to acetone removal and recovery according to the invention. The cylinders varied from 8 inches in diameter by 28 inches high to 12 inches in diameter by 41 inches high.

The valves were removed and the cylinders were inspected to ensure that all fusible metal plugs were intact. Care was also taken to ensure that no defect in the shell existed that could possible leak during the heating and acetone-removal process.

Each cylinder was fitted with an conventional quick-connect adaptor at the valve inlet of the cylinder to enable the cylinders to be connected to the manifold system. The cylinders were then connected to a manifold system.

The cylinders now all interconnected with the manifold system were placed into an oven capable of producing temperatures of over 200° F. The manifold system was made from steel piping and teflon lined flexible pigtails. A quick connect adaptor was used between the cylinder and flexible pigtail.

Each cylinder group manifold was then connected to a single pipe which was connected to a condensing unit consisting of an aluminum heat exchanger. The condensing unit was connected to a storage vessel.

The oven was heated to 195° F. for 18 hours. The heating was then terminated and the cylinders removed from oven.

The total recovery of acetone was 1,430 lbs, i.e. about 247 gallons (specific gravity of 0.799 at 70° F.).

Example 2

In this example, the system was the same as in Example 1, except for the use of a different condensing unit which changed the results slightly.

The condensing unit was the same aluminum cooling heat exchanger, but was placed in a low temperature environment. The condensor was held at approximately 33° F. for the entire 18 hours.

The total acetone recovery was 1,490 lbs, i.e a slight increase of 4.2%.

This example shows that reduced condensing temperatures improve the efficiency of the system by about 4%.

EXAMPLE 3

In this example, the system was the same as in Example 1, except for the use of a vacuum system to reduce the boiling point of the acetone.

A vacuum was placed on the piping just after the condensor by means of a 350 gallon tank and a vacuum pump.

After 18 hours, the cylinders lost an average of 18.7 lbs of acetone for a total of 1,870 lbs, an increase of 30% over Example 1.

EXAMPLE 4

This example used the same technique as Example 2, except that the condensor and the vacuum tank were cooled to 33° F. using a chilled water/ethylene glycol solution sprayed over the units for the entire 18 hours.

Results showed a 5% increase of acetone recovery over the recovery reported in Example 3.

I claim:

1. A solvent recovery system suitable for recovering solvent from acetylene cylinders, said system comprising:
   one or more acetylene steel cylinders containing a porous filler and organic solvent;
   heating means for heating said cylinders to a temperature above the boiling point of said solvent;
   collecting means for collecting solvent evaporated out of said cylinders; and
   manifold means connecting said cylinders to said collecting means for conveying solvent from said cylinders to said collecting means.

2. A system according to claim 1, wherein said heating means is an oven for directly heating said cylinders with hot air at a temperature of 180° F. to 210° F.

3. A system according to claim 2, wherein said oven is capable of heating said cylinders at a temperature of about 200° F.

4. A system according to claim 1, wherein said heating means is an autoclave.

5. A system according to claim 1, wherein said system comprises means for generating a vacuum within said cylinders, manifold means and collecting means.

6. A system according to claim 1, wherein said system comprises a timing means for controlling the length of time said heating means heats said cylinders.

7. A system according to claim 1, wherein manifold system comprises a series of branch lines connected to respective cylinders, each of said branched lines being connected to a single main line which is connected to said collecting system.

8. A system according to claim 1, wherein said collecting means includes a condensor unit.

9. A system according to claim 8, wherein said condensor unit is an air-cooled aluminum coil heat exchanger.

10. A system according to claim 8, wherein said condensor unit is cooled below ambient temperature.

11. A system according to claim 10, wherein said temperature is 25° to 34° F.

12. A system according to claim 11, wherein said temperature is about 33° F.

13. A system according to claim 1, wherein said collecting means further includes storage means for storing collected solvent.

* * * * *